(12) United States Patent
Ferrara, Jr.

(10) Patent No.: US 10,545,164 B2
(45) Date of Patent: Jan. 28, 2020

(54) AIR MOVEMENT VISUALIZATION DEVICE

(71) Applicant: Arcus Hunting, LLC, Covington, GA (US)

(72) Inventor: Daniel A. Ferrara, Jr., Morris, CT (US)

(73) Assignee: Arcus Hunting, LLC, Covington, GA (US)

( * ) Notice: Subject to any disclaimer, the term of this patent is extended or adjusted under 35 U.S.C. 154(b) by 365 days.

(21) Appl. No.: 15/451,097

(22) Filed: Mar. 6, 2017

(65) Prior Publication Data
US 2017/0176490 A1 Jun. 22, 2017

Related U.S. Application Data

(63) Continuation-in-part of application No. 15/442,249, filed on Feb. 24, 2017, now Pat. No. 9,739,796, which
(Continued)

(51) Int. Cl.
*G01P 13/00* (2006.01)
*G01P 13/02* (2006.01)
(Continued)

(52) U.S. Cl.
CPC ......... *G01P 13/0093* (2013.01); *A01M 31/00* (2013.01); *A01M 31/008* (2013.01);
(Continued)

(58) Field of Classification Search
CPC ... G01P 13/0093; G01P 13/02; A01M 31/008; A01M 31/00; B05B 11/06; F22B 1/28; F22B 1/284
(Continued)

(56) References Cited

U.S. PATENT DOCUMENTS

| 2,311,199 A | 2/1943 | Astradsson |
| 2,609,230 A | 9/1952 | Raleigh |

(Continued)

OTHER PUBLICATIONS

Office Action dated Jun. 16, 2017 for related U.S. Appl. No. 15/442,249; 21 pages.
(Continued)

*Primary Examiner* — Nimeshkumar D Patel
*Assistant Examiner* — Tania Courson
(74) *Attorney, Agent, or Firm* — Hovey Williams LLP

(57) ABSTRACT

A portable device for checking wind direction discharges a visible, and optionally scented, vapor stream into the atmosphere in a well-defined reference direction. In some embodiments, the device includes a power source, a vessel having an internal plenum chamber storing a volume of air, a reservoir containing a vaporizable agent, a vaporizing element associated with the vaporizable agent, and a pressure switch. The vessel is deformable to generate an airflow that operates the pressure switch to temporarily connect the power source to the vaporizing element, thereby energizing the vaporizing element to generate vapor. The airflow also carries the vapor into the atmosphere as a visible vapor stream flowing in the reference direction. The reservoir and vaporizing element may be carried in a cartridge removably mounted on the device. Other embodiments operate similarly, but use alternative means for generating gaseous flow to operate the switch and/or carry vapor into the atmosphere.

19 Claims, 13 Drawing Sheets

Related U.S. Application Data is a continuation of application No. 14/992,394, filed on Jan. 11, 2016, now Pat. No. 9,989,552.

(60) Provisional application No. 62/177,796, filed on Mar. 25, 2015.

(51) Int. Cl.
| | | |
|---|---|---|
| *A01M 31/00* | (2006.01) | |
| *B05B 11/06* | (2006.01) | |
| *F22B 1/28* | (2006.01) | |

(52) U.S. Cl.
CPC .............. *B05B 11/06* (2013.01); *F22B 1/28* (2013.01); *F22B 1/284* (2013.01); *G01P 13/02* (2013.01)

(58) Field of Classification Search
USPC ........................................................ 116/214
See application file for complete search history.

(56) References Cited

U.S. PATENT DOCUMENTS

| | | |
|---|---|---|
| 3,046,192 A | 2/1959 | Bilyeu |
| 3,112,645 A | 12/1963 | Glass |
| 3,200,819 A | 8/1965 | Gilbert |
| 3,207,441 A | 9/1965 | Schreiber |
| 3,658,719 A | 4/1972 | McConnaughey |
| 4,159,672 A | 7/1979 | Garguilo et al. |
| 4,163,038 A | 7/1979 | Nishimura et al. |
| 4,666,638 A | 5/1987 | Baker et al. |
| 4,742,960 A | 5/1988 | Bustillo et al. |
| 4,771,563 A | 9/1988 | Easley |
| 4,937,431 A | 6/1990 | Jameson et al. |
| 5,094,024 A | 3/1992 | Daniels |
| 5,094,025 A | 3/1992 | Daniels |
| 5,161,646 A | 11/1992 | Aurich et al. |
| 5,186,118 A | 2/1993 | Stinson |
| 5,305,541 A | 4/1994 | Simpson |
| 5,307,584 A | 5/1994 | Jarvis |
| 5,359,801 A | 11/1994 | Mattucci et al. |
| 5,429,271 A | 7/1995 | Porter |
| 5,547,616 A | 8/1996 | Dancs et al. |
| 5,622,314 A | 4/1997 | Eason |
| D386,256 S | 11/1997 | Turpin |
| 5,744,106 A | 4/1998 | Eagle |
| 5,832,648 A | 11/1998 | Malone |
| 5,896,692 A | 4/1999 | Collora et al. |
| 5,901,490 A | 5/1999 | Lush |
| 5,914,119 A | 6/1999 | Dawson |
| 5,918,531 A | 7/1999 | Oh |
| 5,970,643 A | 10/1999 | Gawel, Jr. |
| 6,038,805 A | 3/2000 | Smidtke |
| 6,044,842 A * | 4/2000 | Pereira .................... A62B 9/04 |
| | | 128/202.27 |
| 6,050,016 A | 4/2000 | Cox |
| 6,240,248 B1 | 5/2001 | Fore |
| 6,241,161 B1 | 6/2001 | Corbett |
| 6,421,502 B1 | 7/2002 | Aronie et al. |
| 6,443,434 B1 | 9/2002 | Prather |
| 6,592,104 B2 | 7/2003 | Cox |
| 6,610,254 B1 | 8/2003 | Furner et al. |
| 6,655,604 B2 | 12/2003 | Tuttobene, Jr. |
| 6,708,649 B1 * | 3/2004 | Lalor .................... A01K 15/02 |
| | | 119/709 |
| 6,745,950 B1 | 6/2004 | Longo |
| 6,820,363 B1 | 11/2004 | Averette, Jr. |
| 6,857,214 B1 | 2/2005 | Pelissier |
| 6,983,103 B1 | 1/2006 | Parcher |
| 7,133,605 B2 | 11/2006 | Niemeyer |
| 7,290,445 B2 | 11/2007 | Kirollos et al. |
| 7,350,411 B2 | 4/2008 | Anderson |
| 7,377,493 B2 | 5/2008 | Thomas |
| 7,419,102 B2 | 9/2008 | Harris, Jr. |
| 7,721,597 B2 | 5/2010 | Onishi |
| 7,765,863 B1 | 8/2010 | Woolsey |
| 7,845,359 B2 | 12/2010 | Montaser |
| 7,874,207 B2 | 1/2011 | Galley et al. |
| 7,883,677 B2 | 2/2011 | Palozzi |
| 7,997,280 B2 | 8/2011 | Rosenthal |
| D649,630 S | 11/2011 | Kaplan et al. |
| 8,156,944 B2 | 4/2012 | Han |
| 8,320,300 B2 | 11/2012 | Nylander et al. |
| 8,424,379 B2 | 4/2013 | Bibby |
| 8,490,889 B2 | 7/2013 | Rydbom |
| 8,910,640 B2 | 12/2014 | Sears et al. |
| 9,320,300 B2 | 4/2016 | Hon |
| 9,426,977 B1 | 8/2016 | Wynalda, Jr. |
| 9,739,796 B2 * | 8/2017 | Ferrara, Jr. ......... G01P 13/0093 |
| D812,706 S * | 3/2018 | Ferrara, Jr. ......... G01P 13/0093 |
| | | D22/108 |
| 9,989,552 B2 * | 6/2018 | Ferrara, Jr. ......... G01P 13/0093 |
| 10,264,783 B2 * | 4/2019 | Jespersen ................ A01N 25/04 |
| 2003/0020185 A1 | 1/2003 | Cox |
| 2004/0221841 A1 | 11/2004 | Herschel |
| 2008/0098952 A1 * | 5/2008 | Healy ........................ G08B 5/40 |
| | | 116/214 |
| 2008/0244954 A1 | 10/2008 | Shannon |
| 2009/0114228 A1 | 5/2009 | Kirschner |
| 2009/0260271 A1 | 10/2009 | Bailey |
| 2009/0277972 A1 | 11/2009 | Kennon et al. |
| 2009/0277973 A1 | 11/2009 | Kennon |
| 2009/0303704 A1 * | 12/2009 | Schrimmer ............. A63H 27/10 |
| | | 362/184 |
| 2010/0031968 A1 | 2/2010 | Sheikh et al. |
| 2010/0059601 A1 | 3/2010 | Bankers et al. |
| 2010/0126505 A1 | 5/2010 | Rinker |
| 2010/0224119 A1 | 9/2010 | Morris |
| 2010/0242974 A1 | 9/2010 | Pan |
| 2011/0005535 A1 | 1/2011 | Xiu |
| 2011/0011396 A1 | 1/2011 | Fang |
| 2011/0036346 A1 | 2/2011 | Cohen et al. |
| 2012/0111347 A1 | 5/2012 | Hon |
| 2012/0223102 A1 * | 9/2012 | Ambrose, Jr. ...... A01M 31/008 |
| | | 222/145.5 |
| 2012/0272968 A1 | 11/2012 | Kirschner |
| 2013/0292857 A1 * | 11/2013 | Connors ............. B01F 3/04241 |
| | | 261/30 |
| 2014/0290650 A1 | 10/2014 | Ivey |
| 2014/0352630 A1 | 12/2014 | Messina |
| 2015/0027459 A1 | 1/2015 | Collett |
| 2015/0189855 A1 | 7/2015 | Norris |
| 2015/0257449 A1 | 9/2015 | Gabbay |
| 2015/0359230 A1 | 12/2015 | Messina |
| 2016/0069924 A1 * | 3/2016 | Norris ..................... G01P 13/02 |
| | | 73/170.04 |
| 2016/0309701 A1 | 10/2016 | DeHaven |
| 2016/0310624 A1 * | 10/2016 | Wynalda, Jr. ............ F22B 1/284 |
| 2019/0064200 A1 * | 2/2019 | Ferrara, Jr. ......... G01P 13/0093 |
| 2019/0308213 A1 * | 10/2019 | Mispel-Beyer ..... B05B 12/0026 |

OTHER PUBLICATIONS

Bow Staff, Cirrus Hunt Vape article, Bowhunting.com Newsletter, Jan. 5, 2016, 3 pages, https://www.bowhunting.com/blog/2016/01/05/cirrus-hunt-vape/.

Webpage of YouTube video dated Jan. 6, 2016, https://www.bowhunting.com/video/cirrus-vape-wind-indicator-2016-ata-show/.

Screenshot of YouTube video dated Jan. 6, 2016, https://www.bowhunting.com/video/cirrus-vape-wind-indicator-2016-ata-show/.

Office Action dated Sep. 28, 2017 for related U.S. Appl. No. 14/992,394, filed Jan. 11, 2016; 15 pages.

\* cited by examiner

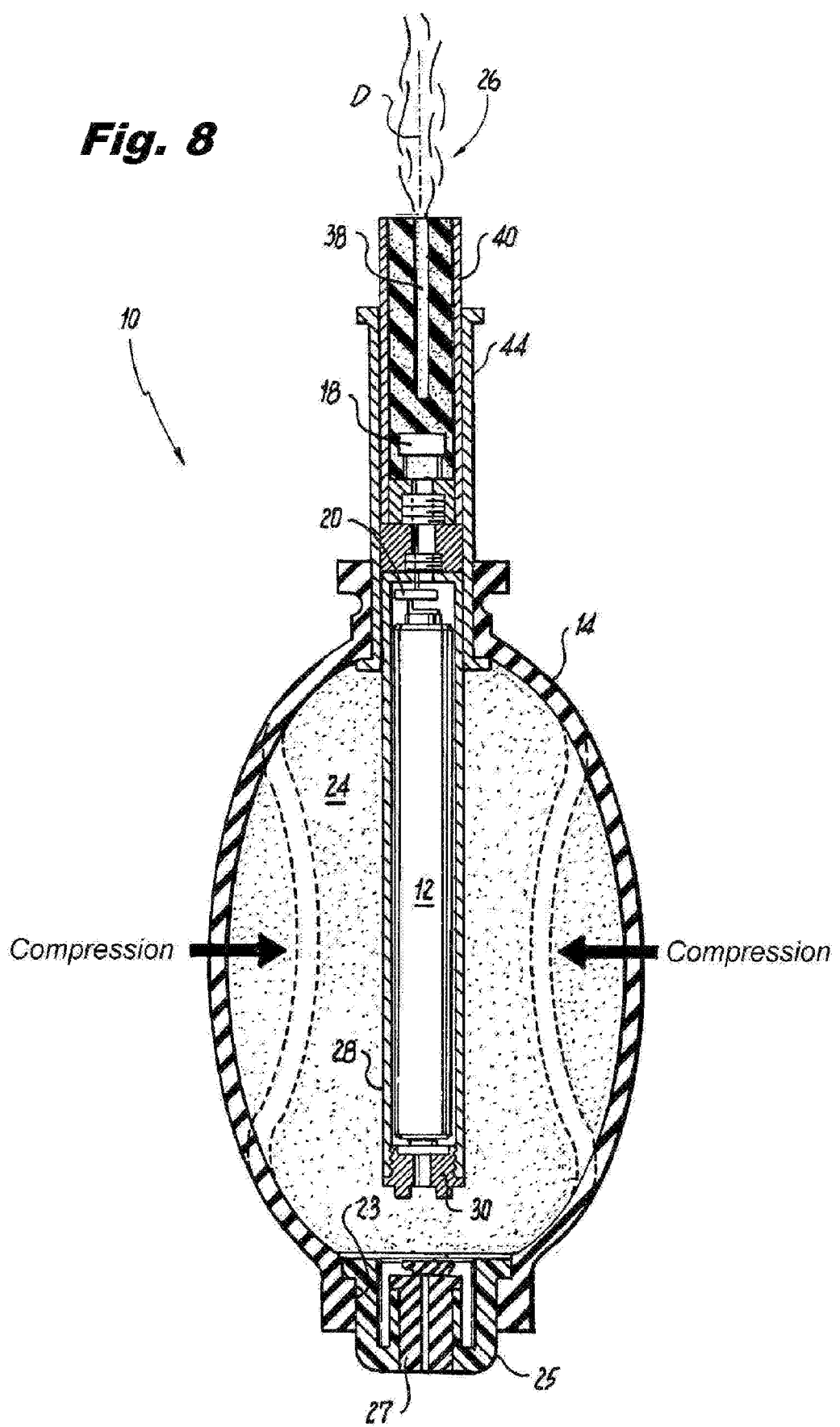

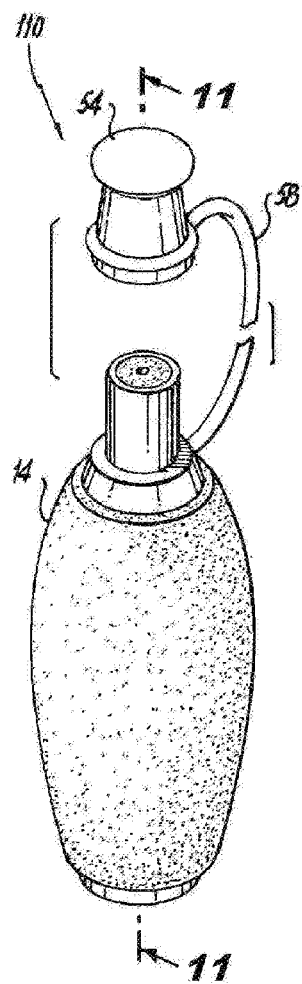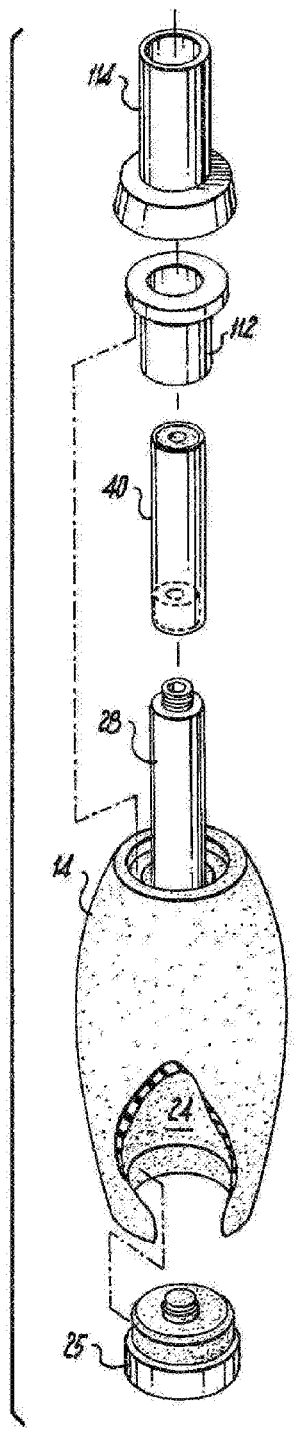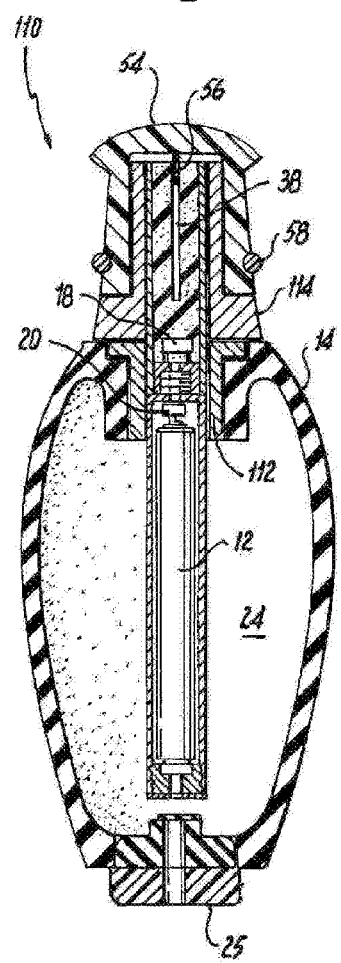

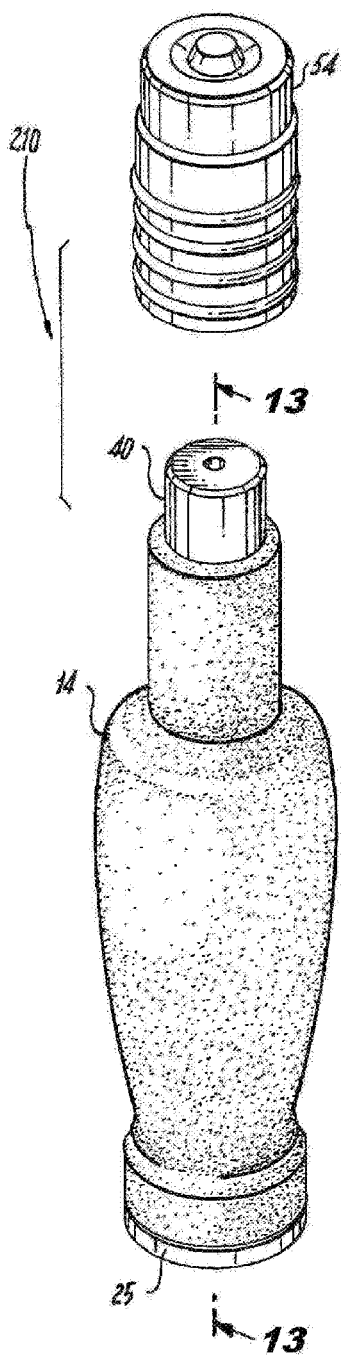
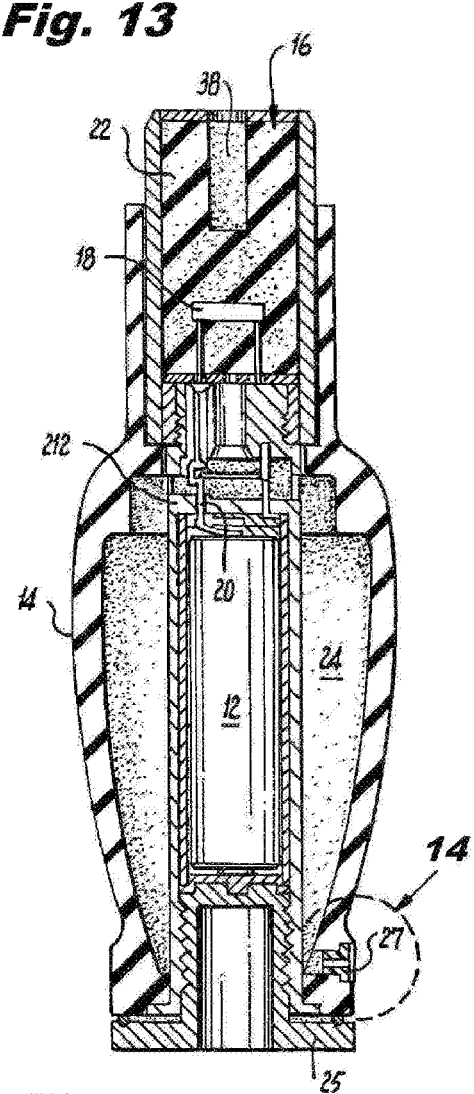
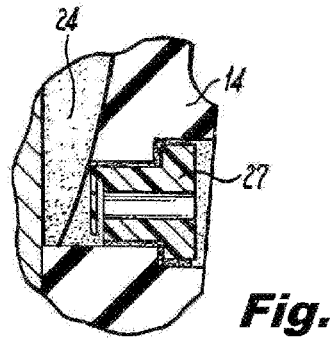
Fig. 12
Fig. 13
Fig. 14

AIR MOVEMENT VISUALIZATION DEVICE

CROSS-REFERENCE TO RELATED APPLICATIONS

This application is a continuation-in-part of U.S. patent application Ser. No. 15/442,249 filed Feb. 24, 2017, which is a continuation of U.S. patent application Ser. No. 14/992,394 filed Jan. 11, 2016, which claims benefit under 35 U.S.C. § 119(e) based on U.S. Provisional Application No. 62/177,796 filed on Mar. 25, 2015, the entire disclosures of each of the above-described applications is incorporated herein by reference.

FIELD OF THE INVENTION

The present invention relates generally to devices that allow a user to visually determine wind currents, drafts, and other types of airflow. Such devices are used, for example, by hunters, golf players, sailors, and HVAC technicians.

BACKGROUND OF THE INVENTION

Devices for visualizing wind currents and other types of airflow are known. In a common arrangement, a resiliently deformable bottle carries a fine powder material, and the user squeezes the bottle to discharge a puff of air including the visible powder material into the atmosphere. The powdered stream of air may be viewed by the user as it is acted upon by wind currents or other localized airflow, thereby providing the user with a visual indication of the direction and strength of such airflow. Examples of powder discharge visualization devices are described in U.S. Pat. No. 5,186,118 (Stinson); U.S. Pat. No. 7,765,863 (Woolsey); and U.S. Pat. No. 8,424,379 (Bibby). A disadvantage of this type of device is that the powder is susceptible to clumping caused by humid atmospheric conditions, and this may render the device unusable. Powder discharge devices are also messy to reload.

Electronic wind gauges are also known wherein a liquid is vaporized by energizing a heating element. Examples of this type of wind gauge are disclosed in U.S. Pat. No. 2,311,199 (Astradsson) and U.S. Pat. No. 4,326,119 (Swiatosz). Known electronic wind gauges are structurally complex and do not provide an organized stream of air for carrying the vapor into the atmosphere as a well-defined line of vapor indicating a reference direction. Unintended discharge may also be a problem if the electronic device is accidentally turned on when a user is reaching for other equipment, such as a gun or ammunition.

What is needed is a reliable, compact, easily portable wind tracking device that discharges a well-defined line of visible vapor and is not susceptible to accidental discharge.

SUMMARY OF THE INVENTION

The present invention provides a compact portable device for checking wind direction and strength by discharging a visible vapor stream into the atmosphere. The vapor stream is discharged in a well-defined reference direction, and the effects of local wind or air currents on the vapor stream may be visually observed by a user to qualitatively judge direction and strength of the wind or air currents. The vapor stream may carry a scent, for example a scent that attracts animals and/or disguises human scent.

In some embodiments, the device generally comprises a power source, a vessel including an internal plenum chamber for storing a volume of air, a reservoir containing a vaporizable agent, a vaporizing element associated with the vaporizable agent, and a pressure switch activated by airflow. The vessel is deformable to generate a flow of air, and the pressure switch is arranged in the flow of air and is operated by the flow of air to selectively connect the power source to the vaporizing element, thereby energizing the vaporizing element to vaporize at least a portion of the vaporizable agent. The flow of air also carries the vapor into the atmosphere as a visible vapor stream flowing in a reference direction. The vaporizing agent may be a glycol-based fluid, and the vaporizing element may be a heating element of piezoelectric element arranged in association with the vaporizable agent.

The reservoir and the vaporizing element may be carried in a cartridge that is removably mounted on the device. The reservoir may have a vapor discharge passage defining the reference direction of the vapor stream. The device may further comprise a removable cap for preventing airflow from the plenum chamber of the vessel to the atmosphere when the device is not in use, wherein the cap includes an internal stopper arranged to seal the vapor discharge passage. The vessel may be embodied as a hollow bladder made of resiliently deformable material, or as a bellows or piston and cylinder.

Other embodiments operate in a similar manner, but comprise various alternative means for generating a flow of air or other gas to operate the switch and/or carry generated vapor into the atmosphere. For example, alternative embodiments are disclosed that use a fan, a user's exhalation, and a container of pressurized gas, respectively, to generate gaseous flow.

BRIEF DESCRIPTION OF THE DRAWINGS

The nature and mode of operation of the present invention will now be more fully described in the following detailed description of the invention taken with the accompanying drawing figures, in which:

FIG. 8 is a cross-sectional view taken generally along the line 8-8 in FIG. 2 illustrating operation of the apparatus of the first embodiment;

FIG. 9 is a perspective view of an air movement visualization apparatus formed in accordance with a second embodiment of the present invention;

FIG. 10 is an exploded perspective view of the air movement visualization apparatus shown in FIG. 9;

FIG. 11 is a cross-sectional view taken generally along the line 11-11 in FIG. 9;

FIG. 12 is a perspective view of an air movement visualization apparatus formed in accordance with a third embodiment of the present invention;

FIG. 13 is a cross-sectional view taken generally along the line 13-13 in FIG. 12;

FIG. 14 is an enlarged cross-sectional view showing a one-way check valve of the apparatus shown in FIGS. 12 and 13;

DETAILED DESCRIPTION OF THE INVENTION

Figure 1:
FIG. 1 is a perspective view showing an air movement visualization apparatus formed in accordance with a first embodiment of the present invention being used by hunter.
Figure 2:
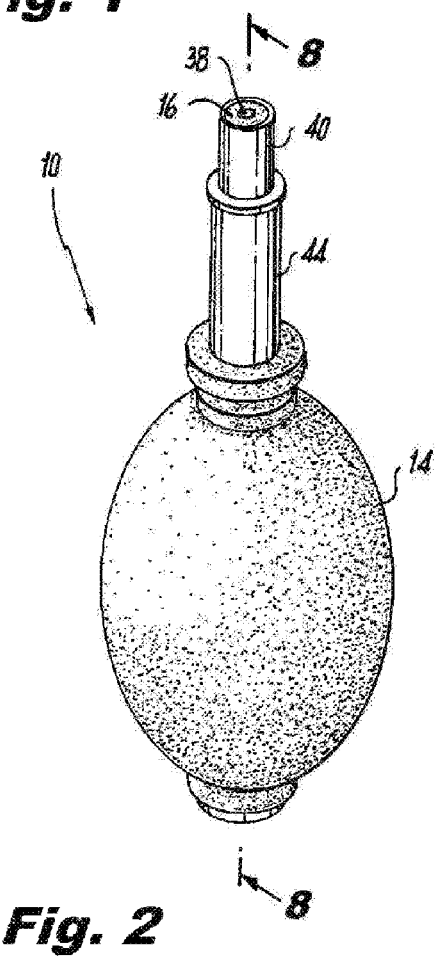
FIG. 2 is a perspective view of the air movement visualization apparatus shown in FIG. 1.
Figure 3:
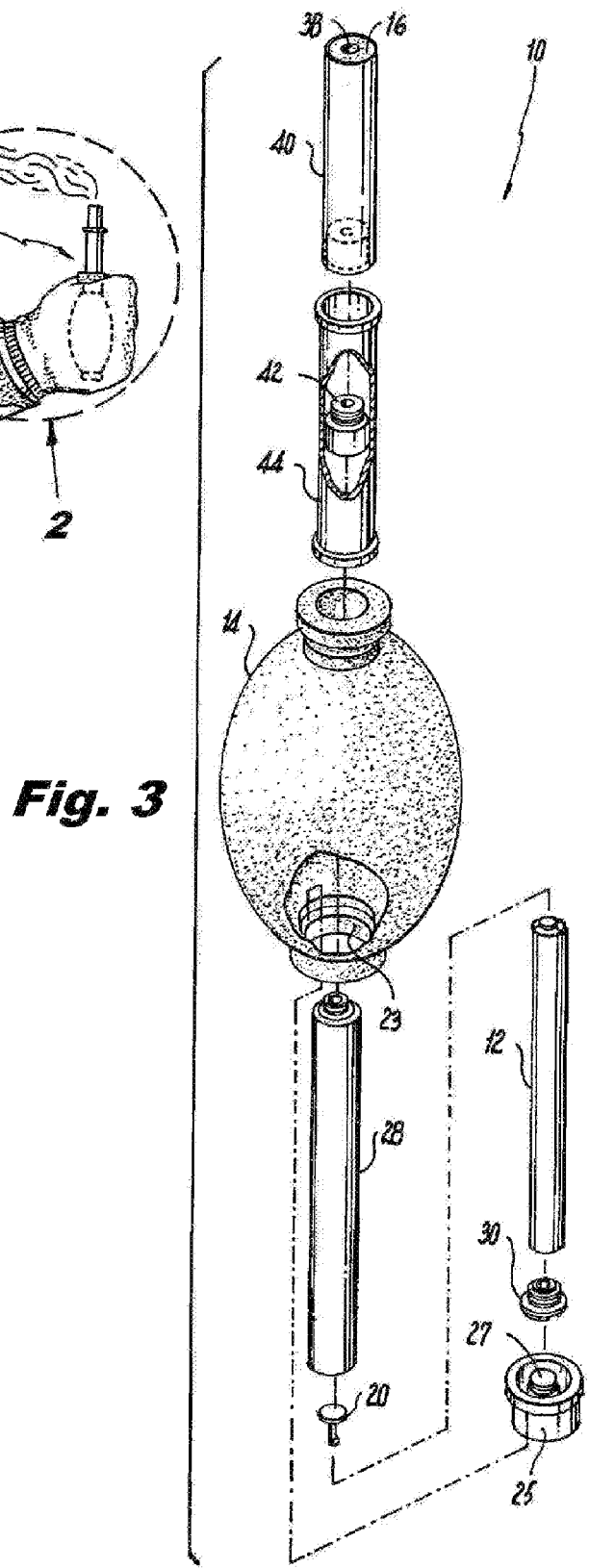
FIG. 3 is an exploded perspective view of the air movement visualization apparatus shown in FIG. 1.
Figure 4:
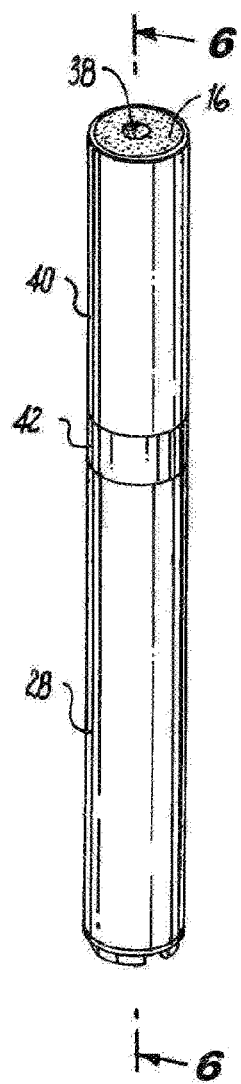
FIG. 4 is a perspective view of a battery housing and vapor cartridge subassembly of the apparatus shown in FIG. 1.

FIGS. 1 through 8 show an apparatus 10 formed in accordance with a first embodiment of the present invention. Apparatus 10 is a portable hand-held device operable by a user to visualize air movement. Apparatus 10 has utility for hunters, golf players, sailors, military personnel, and others seeking to determine wind direction and strength by visual tracking. Apparatus 10 also has utility for heating and cooling technicians and energy use auditors seeking to visualize flow through air ducts and identify leaky doors, windows, etc. in homes and buildings.

Apparatus 10 generally comprises a power source 12, a vessel 14, a reservoir 16, a vaporizing element 18, and a switch 20. Reservoir 16 contains a vaporizable agent 22, for example propylene glycol, vegetable glycerin, or other organic compound. Vaporizing element 18 is associated with vaporizable agent 22 and may be energized by power source 12 to vaporize vaporizable agent 22. Switch 20 is operable to connect and disconnect vaporizing element 18 to and from power source 12. Vessel 14 includes an internal plenum chamber 24 for storing a volume of air, and is deformable to generate a flow of air. Switch 20 is a pressure-sensitive switch arranged such that the flow of air generated by deforming vessel 14 operates switch 20 to temporarily connect vaporizing element 18 to power source 12. As may be understood, vaporizing element 18 is briefly energized to vaporize some of the vaporizable agent 22, thereby producing visible vapor. The visible vapor is carried by the flow of air into the atmosphere as a thin vapor stream 26 flowing in a reference direction D as it leaves apparatus 10.

Figure 5:
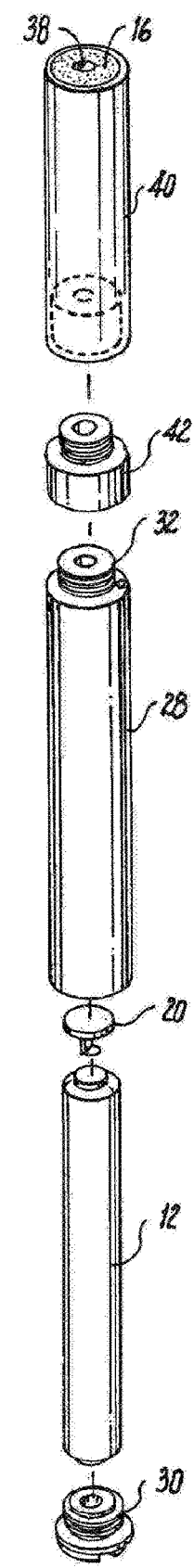
FIG. 5 is an exploded perspective view of the subassembly shown in FIG. 4.
Figure 6:
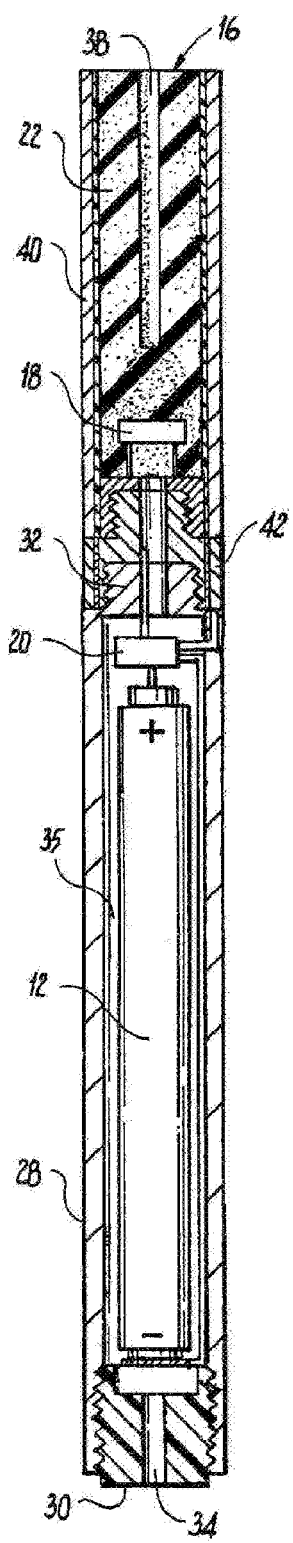
FIG. 6 is a cross-sectional view of the subassembly taken generally along the line 6-6 in FIG. 4.

Power source 12 may include one or more batteries. The batteries may be rechargeable (e.g. lithium ion, nickel-metal hydride, rechargeable alkaline) or non-rechargeable (e.g. disposable alkaline). As shown in FIGS. 5 and 6, power source 12 may be held within an elongated tubular battery housing 28 having a removable base 30 threadably received at a bottom end of the housing and a threaded mating portion 32 at a top end of the housing. Base 30 may be removed for installing and removing power source 12. Base 30 includes an air inlet passage 34 for allowing air to flow from plenum chamber 24 into battery housing 28. Mating portion 32 includes an air outlet passage 36 for allowing air to flow out of battery housing 28. Thus, battery housing 28 includes an air duct defined by air inlet passage 34, space 35 between power source 12 and an inner wall surface of housing 28, and air outlet passage 36 by which the flow of air generated by compressible vessel 14 is communicated through housing 28 to pressure switch 20 and then out of the housing. While not shown in relation to the first embodiment, battery housing 28 may have one or more side ports at a location near pressure switch 20 through which air may enter the battery housing from plenum chamber 24 for communication with the pressure switch.

Vessel 14 may be embodied as a bulb or bladder made of resiliently deformable material, for example synthetic rubber. Alternatively, vessel 14 may be embodied as a bellows, or as a piston and cylinder mechanism, that is manually compressible to generate a flow of air. As best seen in FIG. 8, battery housing 28 may be partially or fully received within plenum chamber 24 of vessel 14 to keep apparatus 10 small and compact for portability. In the first embodiment, vessel 14 includes an access opening 23 for allowing access to battery housing 28, and a plug 25 received by the access opening for sealing the access opening. Plug 25 is removable from access opening 23 to permit access to housing 28 and to power source 12 contained by the housing. A check valve 27 is provided through which air enters plenum chamber 24 and through which air cannot exit the plenum chamber. Check valve 27 may be incorporated into plug 25, as shown in FIG. 8, or the check valve may be provided through a wall of vessel 14 at another location.

Reservoir 16 contains a supply of vaporizable agent 22. As used herein, the term "vaporize" and alternative forms thereof have a broad meaning encompassing atomize, aerosolize, and similar processes wherein fluid is physically dispersed in air by application of heat and/or vibration. Vaporizable agent 22 may be a liquid or gel held by an absorbent matrix material that surrounds vaporizing element 18.

Figure 7:
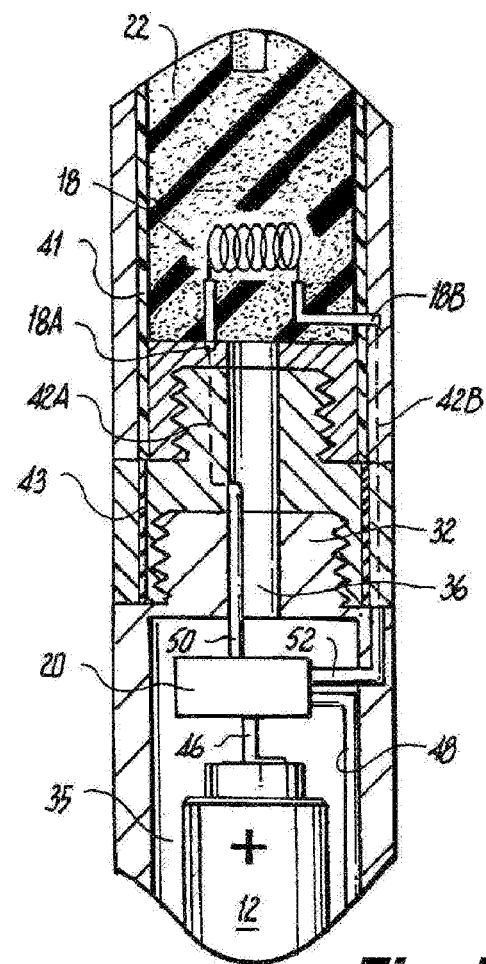
FIG. 7 is an enlarged cross-sectional view of a coupling region of the subassembly shown in FIGS. 4-6.
Figure 7A:
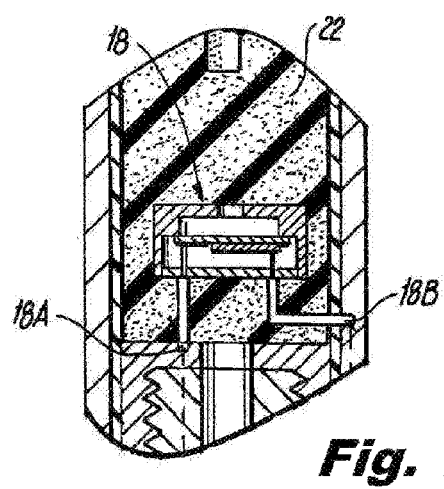
FIG. 7A is an enlarged cross-sectional view showing an alternative vaporizing element of the apparatus.

In FIG. 7, vaporizing element 18 is embodied as a resistive heating element formed of wire. Alternatively, vaporizing element 18 may be embodied as a piezoelectric element as shown in FIG. 7A. When vaporizing element 18 is energized by power source 12, heat or ultrasonic vibrations produced by the vaporizing element act upon vaporizable agent 22 in the vicinity of vaporizing element 18 to generate vapor. Reservoir 16 may be configured to include a vapor discharge passage 38 through which the vapor escapes reservoir 16, wherein the direction of passage 38 defines the reference direction D.

Reservoir 16 and the vaporizing element 18 may be carried in a cartridge 40 removably mounted on apparatus 10. In the first embodiment illustrated by FIGS. 1 through 8, cartridge 40 is removably connected to battery housing 28 by way of a threaded coupler 42. As may be understood, power source 12 and cartridge 40 are independently removable and replaceable, i.e. one may be removed and replaced without removing the other. Upon removal of housing base 30, power source 12 may be removed from housing 28 while cartridge 40 remains connected to housing 28. Cartridge 40 is removable from housing 28 while power source 12 remains in housing 28 by unscrewing cartridge 40 from coupler 42. Apparatus 10 may comprise a rigid tubular receptacle 44 extending from vessel 14, wherein cartridge 40 is slidably received by the receptacle so as to avoid direct frictional contact between cartridge 40 and vessel 14. Receptacle 44 may be metallic, e.g. stainless steel, to reduce friction and facilitate insertion and removal of cartridge 40. Coupler 42 may be fixed to an inner wall surface of receptacle 44. As may be understood, replacement of power source 12 or cartridge 40 is a simple matter that does not require removal of unrelated elements.

Advantageously, threaded coupler 42 may be electrically conductive and may be arranged to electrically connect vaporizing element 18 to pressure switch 20. The electrical connection may be understood by reference to FIGS. 6 and 7. In the depicted embodiment, pressure switch 20 is arranged within battery housing 28 and is connected to the positive and negative terminals of power source 12 by wires 46 and 48, respectively. Switch 20 is also electrically connected to coupler 42 by a positive lead wire 50 contacting a radially inner portion 42A of coupler 42, and by a negative lead wire 52 contacting a radially outer portion 42B of coupler 42. Radially inner and outer portions 42A, 42B are conductive portions electrically insulated from one another by an insulating ring 43. Vaporizing element 18 is connected to pressure switch 20 via coupler 42. When metal cartridge 40 is screwed onto coupler 42, a positive terminal 18A of vaporizing element 18 is electrically connected to inner portion 42A and a negative terminal 18B of vaporizing element 18 is electrically connected to outer portion 42B, thereby forming a circuit including power source 12, pressure switch 20, and vaporizing element 18. An insulating ring 41 is provided in cartridge 40 for electrical insulation between terminals 18A, 18B. Airflow through and/or around battery housing 28 activates pressure switch 20 to temporarily close the switch such that current flows through vaporizing element 18. When the airflow ceases, switch 20 opens to shut off current to vaporizing element 18. Pressure switch 20 may be a commercially available pressure switch or airflow sensor that operates mechanically or has an integrated microprocessor.

FIGS. 9 through 11 depict an air movement visualization apparatus 110 formed in accordance with a second embodiment of the present invention. Apparatus 110 operates in a manner similar to apparatus 10 of the first embodiment, but has some structural differences. For example, coupler 42 is omitted and cartridge 40 is removably connected directly to battery housing 28 by threaded connection. Electrical connection of switch 20 to vaporizing element 18 may be provided through the top portion of housing 28.

In apparatus 110 of the second embodiment, battery housing 28 is fixed to a flanged support bushing 112 received through a top opening in vessel 14 such that the battery housing is suspended within plenum chamber 24. A cover sleeve 114 fits over cartridge 40 and is configured to mate with a removable cap 54. Cap 54 prevents airflow from plenum chamber 24 to the atmosphere when the apparatus is not in use. For example, when cap 54 is tightened to form a seal over reservoir 16, air is trapped within plenum chamber 24 such that vessel 14 cannot be accidentally compressed or squeezed to generate a flow of air that may unintentionally operate switch 20. In the illustrated embodiment, cap 54 includes an internal stopper 56 arranged to seal vapor discharge passage 38. Cap 54 may be provided with a lanyard 58 having a first end coupled to cover sleeve 114 or vessel 14 and a second end coupled to the cap to prevent cap 54 from being lost.

An air movement visualization apparatus 210 formed in accordance with a third embodiment of the present invention is shown in FIGS. 12 through 14. Apparatus 210 operates similar to apparatus 10 of the first embodiment, but incorporates some structural modifications. In apparatus 210, battery housing 28 threadably mates with plug 25, whereby plug 25 acts as a removable base of the housing. Alternatively, plug 25 may be press fitted or snap fitted into the open bottom end of battery housing 28. Access to power source 12 may be gained by unscrewing or otherwise removing plug 25 from battery housing 28 and the bottom of vessel 14. Instead of an air duct extending axially through the length of battery housing 28, a side port 212 is provided through housing 28 such that airflow enters housing 28 near switch 20 to activate the switch. Switch 20 is depicted as a mechanical pressure switch. Check valve 27 is arranged through a side wall of vessel 14, independent of plug 25.

Figure 15:
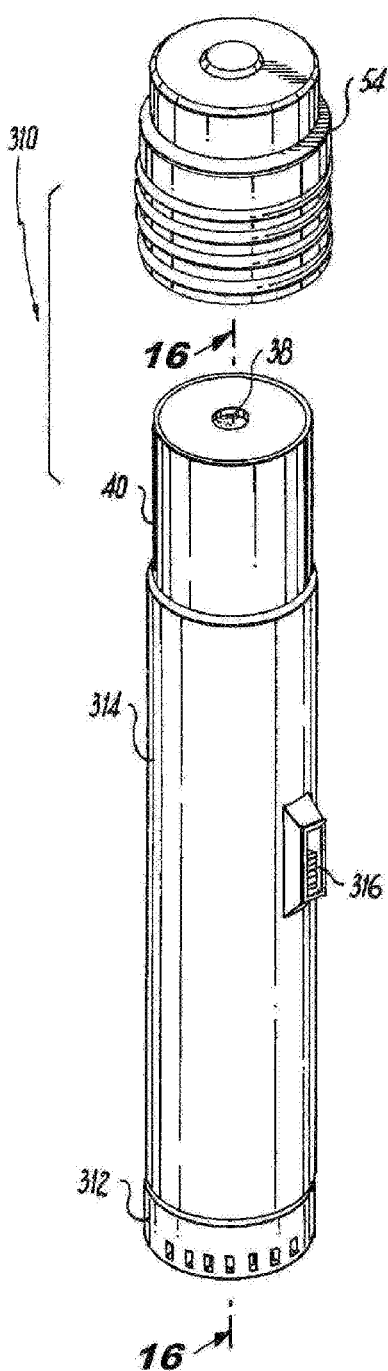
FIG. 15 is a perspective view of an air movement visualization apparatus formed in accordance with a fourth embodiment of the present invention.
Figure 16:
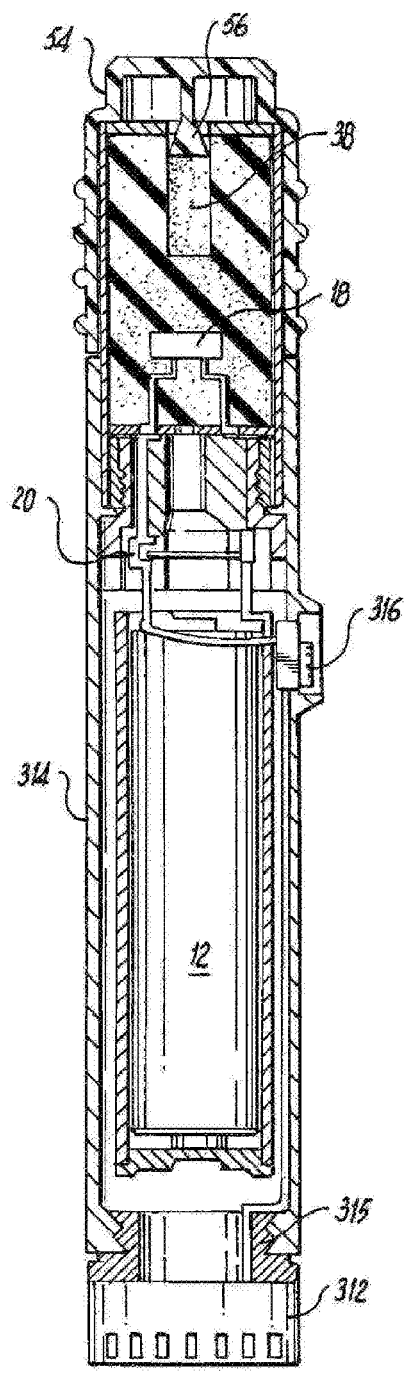
FIG. 16 is a cross-sectional view taken generally along the line 16-16 in FIG. 15.

FIGS. 15 and 16 illustrate an air movement visualization apparatus 310 formed in accordance with a fourth embodiment of the present invention. Apparatus 310 operates in a manner generally similar to the first through third embodiments described above, however it differs from the previous embodiments in that apparatus 310 comprises a small electric fan 312 to generate a flow of air. Fan 312 may be mounted at a base of apparatus shell 314 to provide airflow through battery housing 28, switch 20, and cartridge 40. Fan 312 may be mounted to the base of shell 314 by mating threads 315 so that fan 312 can be unscrewed from shell 314 to permit replacement of power source 12. Apparatus 310 has a manually operated switch 316 for selectively connecting fan 312 to power source 12 to turn the fan on and off. The airflow generated by fan 312 may be used to activate pressure switch 20 to energize vaporizing element 18. Alternatively, manually operated fan switch 316 may be arranged such that it selectively connects both fan 312 and vaporizing element 18 to power source 12, whereby pressure switch 20 may be omitted from apparatus 310. As will be appreciated, the airflow generated by fan 312 carries vapor generated in reservoir 16 through vapor discharge passage 38 and into the atmosphere as a vapor stream flowing in reference direction D. Fan switch 316 may be a momentary switch that shuts off power to fan 312 automatically after a brief predetermined period of time sufficient to cause a stream of vapor to be discharged. Alternatively, fan switch 316 may be an on-off locking switch that remains switched on until the user switches it off.

Figure 17:
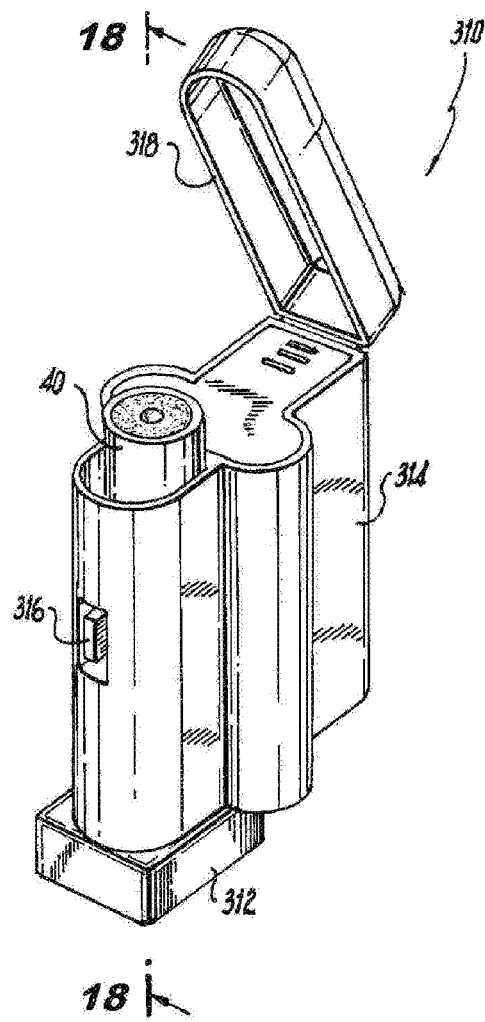
FIG. 17 is a perspective view of an air movement visualization apparatus according to a variation of the fourth embodiment of the present invention.
Figure 18:
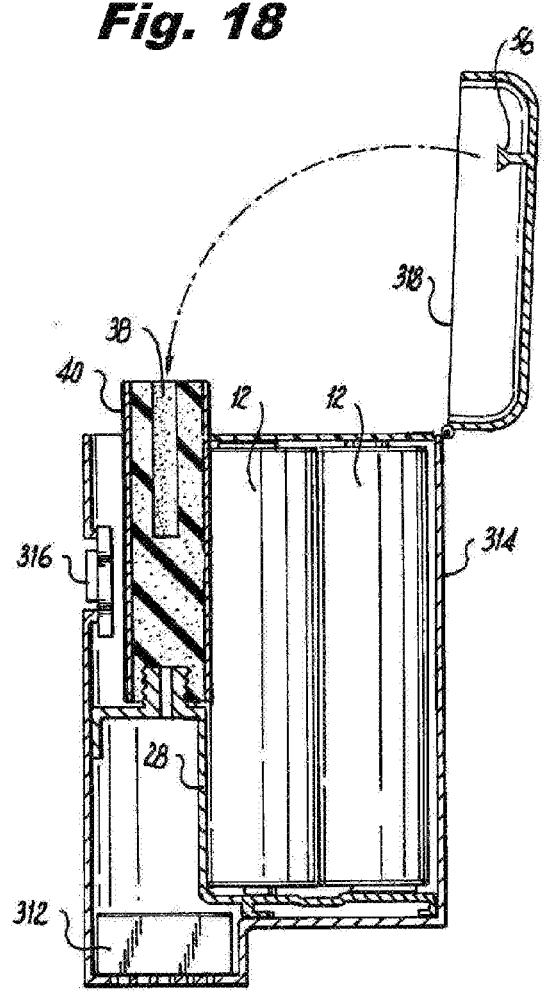
FIG. 18 is a cross-sectional view taken generally along the line 18-18 in FIG. 17.

In a variation of the fourth embodiment depicted in FIGS. 17 and 18, power source 12 may be arranged out of alignment with fan 312 and vapor discharge passage 38. This variation reduces the overall height of apparatus 310. This variation also allows for replacement of power source 12 without removal of fan 312. More specifically, a hinged or otherwise movable cover 318 may be provided on shell 314 to permit direct access to power source 12 without removing fan 312.

In the fourth embodiment, as in the first through third embodiments, the reservoir 16 and the vaporizing element 18 are carried in a cartridge 40 removably mounted on the apparatus. As shown in FIGS. 16 and 18, cartridge 40 may be threadably connected to battery housing 28. Power source 12 is removable from housing 28 while cartridge 40 remains connected to housing 28 by removing fan 312 in FIGS. 15 and 16, or by opening cover 318 in the variation of FIGS. 17 and 18. Cartridge 40 can be unscrewed from housing 28 while power source 12 remains in battery housing 28. Like previous embodiments, cap 54 includes internal stopper 56 arranged to seal vapor discharge passage 38. In the variation of FIGS. 17 and 18, internal stopper 56 may be arranged on the underside of cover 318.

Figure 19:
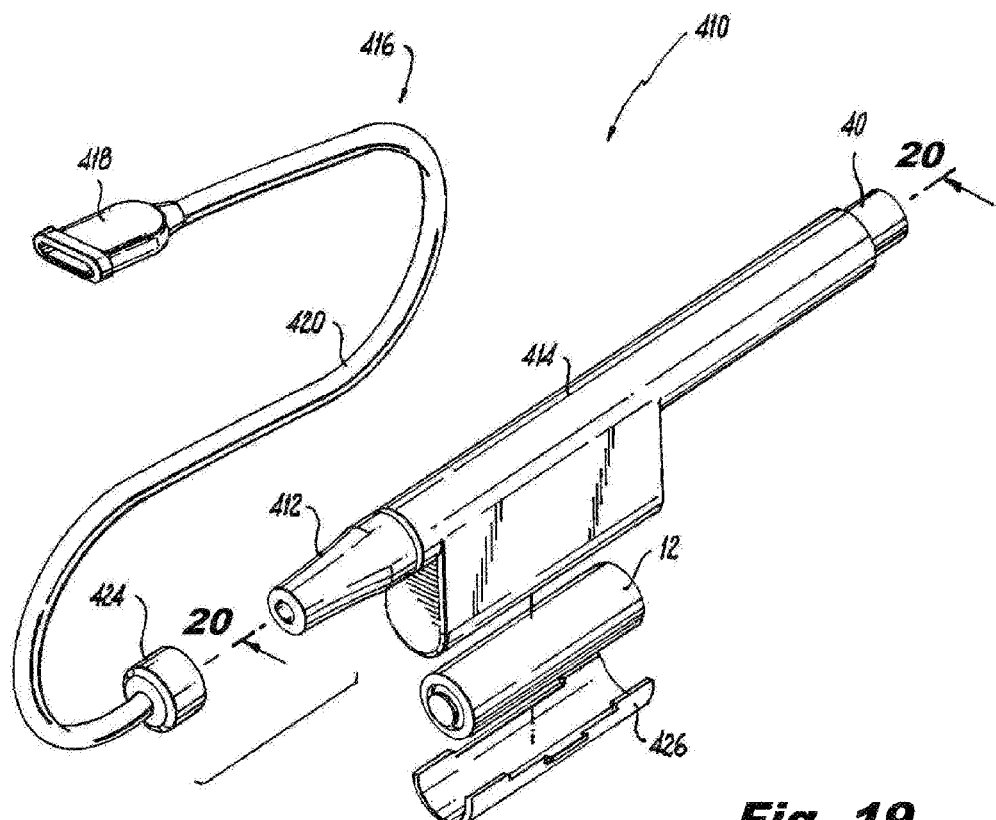
FIG. 19 is a perspective view of an air movement visualization apparatus formed in accordance with a fifth embodiment of the present invention.
Figure 20:
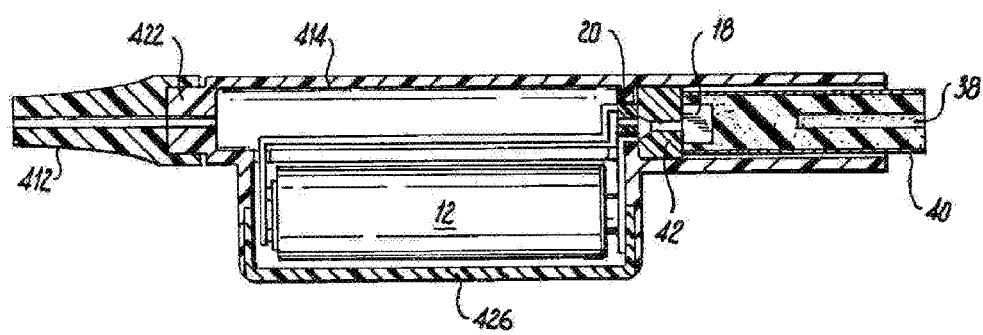
FIG. 20 is a cross-sectional view taken generally along the line 20-20 in FIG. 19.

FIGS. 19 and 20 show an air movement visualization apparatus 410 formed in accordance with a fifth embodiment of the present invention. Apparatus 410 operates by a user blowing into a mouthpiece 412 at one end of the apparatus. Mouthpiece 412 may be removable, for example by threaded or slidable mounting, from apparatus shell 414. A flexible mouthpiece attachment 416 may be provided having a remote mouthpiece 418 communicating with original mouthpiece 412 or with an inlet port 422 of shell 414 through a flexible tube 420. Tube 420 may have an end fitting 424 for quick connection to original mouthpiece 412 or directly to inlet port 422. Flexible mouthpiece attachment 416 allows apparatus 410 to be freely orientated and viewed by the user while blowing into mouthpiece 412 so that the vapor stream may be viewed. Power source 12 is preferably located out of alignment with inlet port 422 and vapor discharge passage 38 to provide a clear path and facilitate actuation of pressure switch 20 by the user. Switch 20 may be connected to vaporizing element 18 by coupler 42 as described in connection with the first embodiment. Cartridge 40 may be threadably connected to coupler 42. A separate door 426 may be provided in shell 414 to allow access to power source 12.

Figure 21:
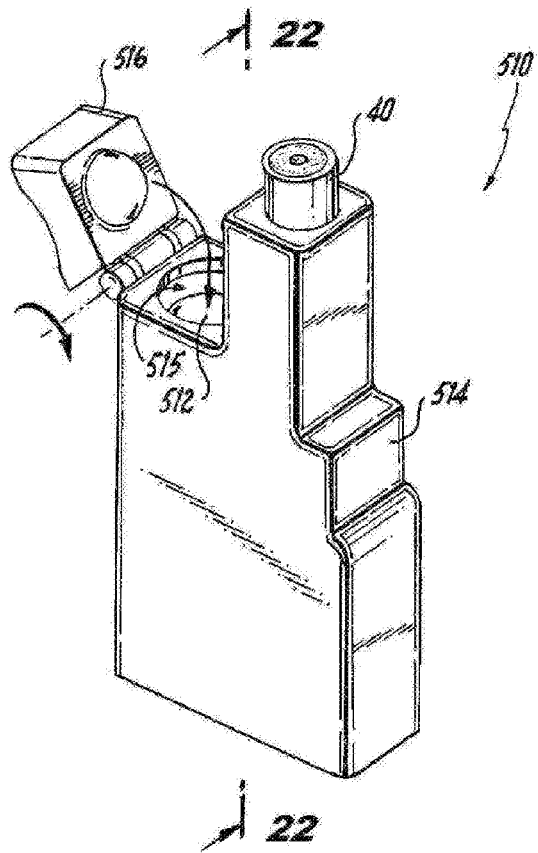
FIG. 21 is a perspective view of an air movement visualization apparatus formed in accordance with a sixth embodiment of the present invention.
Figure 22:
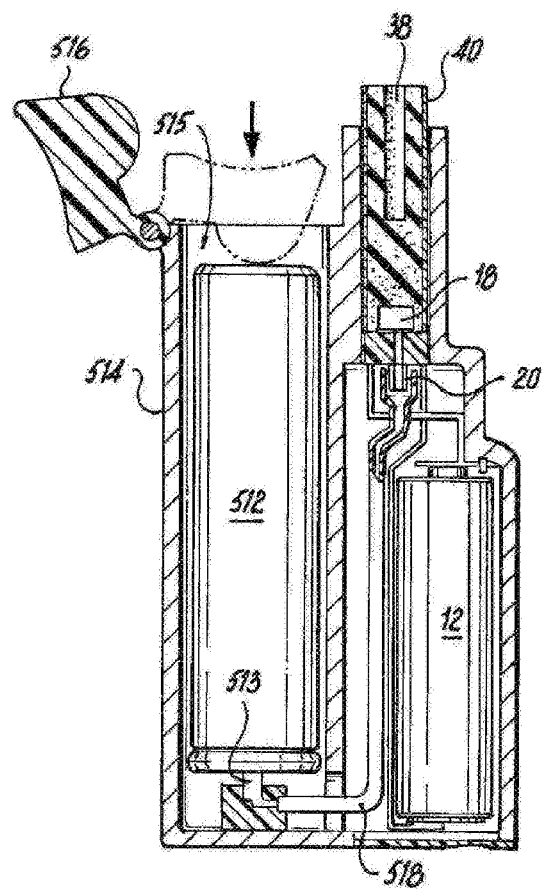
FIG. 22 is a cross-sectional view taken generally along the line 22-22 in FIG. 21

An air movement visualization apparatus 510 formed in accordance with a sixth embodiment of the present invention is illustrated in FIGS. 21 and 22. Apparatus 510 includes a rigid container 512 holding pressurized gas, such as air. Container 512 includes a release valve 513 operable to release a flow of gas from the container. For example, in the embodiment shown, release valve 513 is opened by pressing container 512 in a downward direction as viewed in FIG. 22. An actuating member 516 may be provided at an end of container 512 opposite release valve 513, wherein the actuating member 516 may be pressed by a user to apply force to operate release valve 513. For example, actuating member 516 may be pivotally hinged to an outer shell 514 of apparatus 510.

Apparatus 510 may comprise a gas duct 518 arranged to communicate a flow of gas released through valve 513 to pressure switch 20, thereby activating the pressure switch to temporarily connect vaporizing element 18 to power source 12. As in the previous embodiments, the flow of gas carries vapor into the atmosphere as a vapor stream flowing in reference direction D.

When rigid container 512 loses its charge of pressurized gas, it may be replaced with a charged container by pivoting actuating member 516 back to allow container 512 to be withdrawn from a compartment 515 of apparatus shell 514 and the new container to be inserted into the compartment. A separate door (not shown) may be provided in shell 514 to allow access to power source 12.

As an optional feature applicable to all the embodiments described herein, vaporizable agent 22 may be scented. For example, vaporizable agent 22 may contain scents for luring deer and other animals, obscuring human scent, and/or repelling insects. Vaporizable agent 22 may also contain pleasing scents, such as scents produced by essential oils.

As another optional feature applicable to all embodiments, a safety shut-off switch may be provided to ensure that power source 12 is not drained down unnecessarily should pressure switch 20 or fan switch 316 fails to automatically shut off (where fan switch 316 is momentary), or where the user forgets to turn fan switch 316 off (where fan switch 316 is a locking on-off switch).

As a further optional feature applicable to all embodiments, a fuel gauge may be provided to indicate charge remaining in power source 12 or to indicate when remaining charge falls below a threshold level. For example, a blinking LED may be used to signal to the user that the charge remaining in power source 12 has dropped below a threshold level and the power source 12 should be recharged or replaced.

Figure 23:
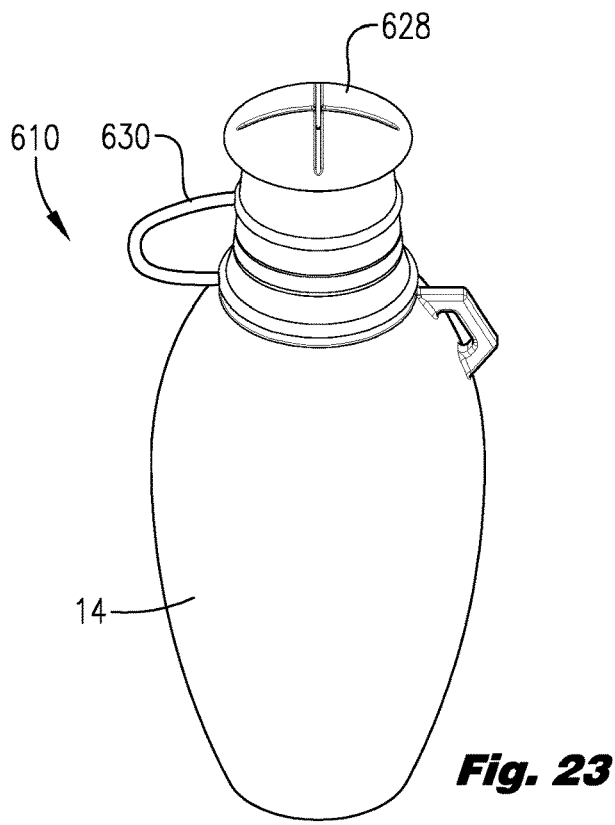
FIG. 23 is a perspective view of an air movement visualization apparatus formed in accordance with a seventh embodiment of the present invention.
Figure 24:
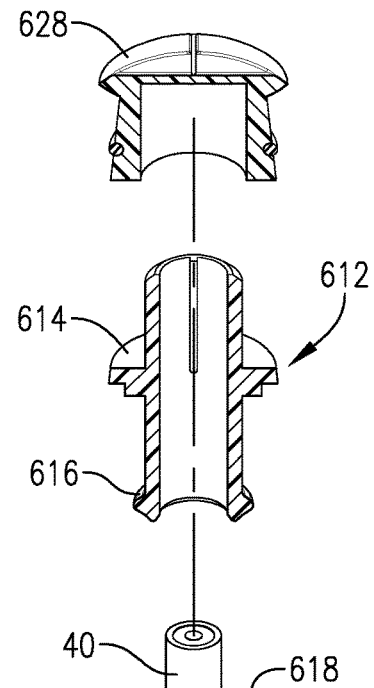
FIG. 24 is an exploded perspective cross-sectional view of the air movement visualization apparatus shown in FIG. 23.
Figure 25:
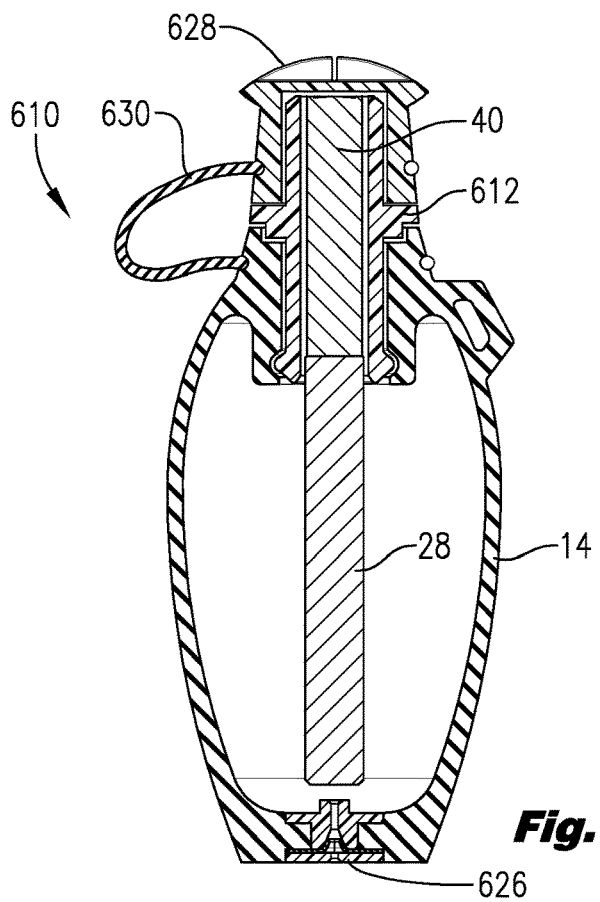
FIG. 25 is an elevation cross-sectional view of the air movement visualization apparatus shown in FIGS. 23-24.

An air movement visualization apparatus 610 formed in accordance with a seventh embodiment of the present invention is illustrated in FIGS. 23 through 25. Apparatus 610 operates in a manner similar to apparatus 110 of the second embodiment, but has some structural differences. For example, flange support bushing 112 and cover sleeve 114 are omitted and replaced with a unitary exclusion piece 612 shown in FIGS. 24 and 25. The exclusion piece 612 is a hollow, generally cylindrical component configured to securely retain the vapor cartridge 40 therein. Additionally, the exclusion piece 612 is sized and shaped to be securely received within the top opening of the vessel 14. As discussed previously, the battery housing 28 can be threadedly secured to the vapor cartridge 40. As such, the exclusion piece 612 is configured to support both the battery housing 28 and the vapor cartridge 40 (i.e., the battery housing and vapor cartridge assembly) within and/or with respect to the vessel 14, as shown in FIG. 25.

With reference to FIG. 24, the exclusion piece 612 is a generally hollow cylinder and includes a flange section 614 extending circumferentially about an exterior surface of the cylinder. The flange section 614 may be positioned approximately midway about a height (approximately the center) of the exclusion piece 612. However, in certain embodiments, the flange section 614 may be offset from the center of the exclusion piece 612. The exclusion piece 614 may additionally include a circular tab section 616 extending circumferentially about an exterior surface of the cylinder. The tab section 616 may be positioned near a bottom end of the exclusion piece 612.

As shown in FIG. 25, the exclusion piece 612 may be received within the top opening of the vessel 14. The top opening of the vessel 14 may be presented by a neck of the vessel 14. As shown in FIG. 24, to facilitate a secure engagement between the vessel 14 and the exclusion piece 612, the neck may include a flange-engaging surface 618 and a tab-receiving groove 620. As shown in FIG. 25, with the exclusion piece 612 received within the top opening of the vessel 14, the flange section 614 of the exclusion piece 612 may be engaged with the flange-engaging surface 618 of the neck, and the tab section 616 of the exclusion piece 612 may be engaged with the tab-receiving groove 620 of the neck. In some embodiments, the exclusion piece 612 may be formed from a partially deformable material, such as plastic or rubber. As such, the exclusion piece 612 may be removeably engaged with the vessel 14 in a snap-fit manner.

Figure 26:
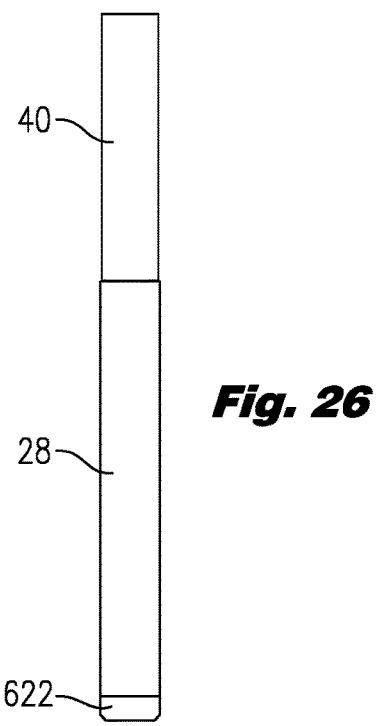
FIG. 26 is an elevation view of a battery housing and vapor cartridge assembly of the apparatus shown in FIGS. 23-25.

As illustrated in FIG. 25, the exclusion piece 612 is configured to secure the battery housing 28 and the vapor cartridge 40 with respect to the vessel 14. A schematic illustration of the battery housing 28 threadedly secured to the vapor cartridge 40 is illustrated in FIG. 26. In the embodiment of the battery housing and vapor cartridge assembly shown in FIG. 26, a bottom of the battery housing 28 may include a light-emitting diode ("LED") 622 operable to signal to the user (e.g., turning on, blinking, etc.) that the electric power charge remaining in power source 12 has dropped below a threshold level and the power source 12 should be recharged or replaced. In some embodiments, a bottom portion of the vessel 14 may be formed with a translucent material (or partially-translucent material), or of a sufficiently thin section of material, so as to function as a viewing port to permit a user of the apparatus 610 to observe the LED 622 (when the battery housing 28 is positioned within the vessel as shown in FIG. 25) from outside the vessel 14 and to determine that the power source 12 needs to be recharged.

Figure 27:
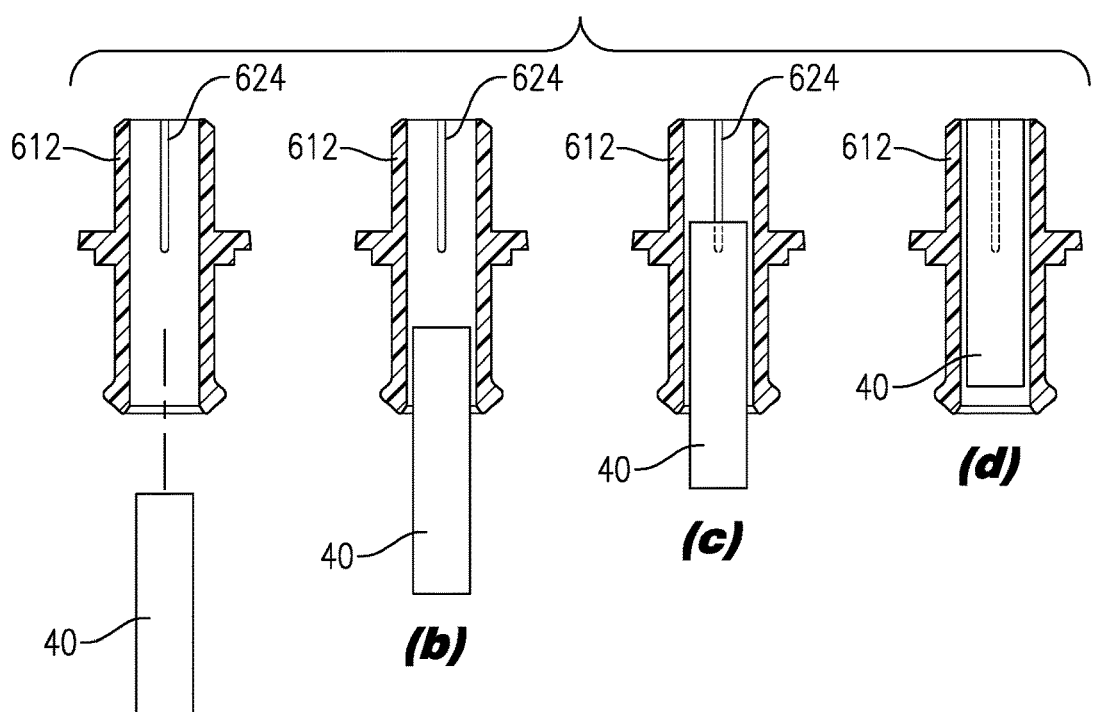
FIGS. 27(a)-(d) are four elevation views illustrating a vapor cartridge from the assembly of FIG. 26 in various stages of insertion within an exclusion piece from the apparatus shown in FIGS. 23-25.
Figure 28:
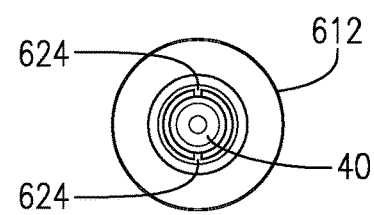
FIG. 28 is a top plan view of the vapor cartridge fully engaged within the exclusion piece, as illustrated in FIG. 27(d)

For the exclusion piece 612 to support the battery housing and vapor cartridge assembly, the vapor cartridge 40 may initially be individually secured within the exclusion piece 612. To accomplish such, the vapor cartridge 40 may be inserted within the exclusion piece 612, as illustrated in FIGS. 27(a)-(d). In particular, the vapor cartridge 40 may be inserted, under pressure, into the bottom end of the exclusion piece 612 until a top end of the vapor cartridge 40 is generally even with a top end of the exclusion piece 612, as is shown in FIG. 27(d). An interior diameter of the exclusion piece 612 may correspond with an outer diameter of the vapor cartridge 40, such that the vapor cartridge 40 can be securely held within the exclusion piece 612 by press fit or friction fit. To facilitate such a press fit, the exclusion piece 612 may include one or more protrusion elements 624 extending along a portion of the interior of the exclusion piece 612, as shown in FIGS. 27(a)-(d). As shown in FIG. 28, the exclusion piece 612 may include at least two protrusion elements 624. Such protrusion elements 624 function to frictionally engage the vapor cartridge 40 so as to assist in securely holding the vapor cartridge 40 within the exclusion piece 612.

Once the vapor cartridge 40 is completely secured within the exclusion piece 612, as shown in FIG. 27(d), the battery housing 28 can be secured to the vapor cartridge 40 (e.g., threadedly secured), such that the exclusion piece 612 can support the battery housing and vapor cartridge assembly with respect to the vessel 14. In particular, the exclusion piece 612 (while supporting the battery housing and vapor cartridge assembly) can be inserted within the vessel 14, as shown in FIG. 25. For instance, the exclusion piece 612 may be positioned within the vessel 14 such that a bottom surface of the flange section 614 is engaged with the flange-engaging surface 618 of the vessel 14 and the tab section 616 may be engaged with the tab-receiving groove 620 of the vessel 14. In such a configuration, the battery housing 28 is suspended within the vessel 14 and the vapor assembly 40 is securely held by the exclusion piece 612 within the top opening of the vessel 14. In particular, a majority of the vapor cartridge 40 may extend out from the vessel 14 such that the vapor discharge of the vapor cartridge 40 is exposed to the environment. As such, the apparatus 610 can be used to generate visual vapor, in the manner previously described.

Beneficially, the combination of the exclusion piece 612 and the vapor cartridge 40 may be provided as an assembly. As such, once an initial vapor cartridge 40 has been depleted of its vaporizable agent, the exclusion piece and vapor cartridge assembly may be removed from the vessel 14, and the battery housing 28 may be removed from the vapor cartridge 40. As such, the power source 12 may be recharged. Thereafter, a new exclusion piece and vapor cartridge assembly, with a new vapor cartridge 40 full of vaporizable agent, can be secured to the battery housing 28 (with the recharged power source 12) and installed within the vessel 14. As such, the apparatus 610 can again be used to generate visual vapor, in the manner previously described.

An additional difference between apparatus 610 and apparatus 110, is that apparatus 610 does not include the removable plug 25. Instead, as shown in FIGS. 24 and 25, the apparatus 610 may include a valve 626, such as a one-way check valve, which is embedded within a bottom portion of the vessel 14. A bottom surface of the valve 626 may, as shown in FIGS. 24 and 25 be generally flush with a bottom surface of the vessel 14. In certain embodiments, the valve 626 will be aligned with the top opening of the vessel 14. In some additional embodiments, the valve 626 may be formed from a translucent (or partially translucent material) so as to permit a user to view the LED 622 of the battery housing 28 through the valve 626.

In apparatus 610 of the seventh embodiment, a cap 628 may be used to prevent airflow from the vessel 14 to the atmosphere when the apparatus is not in use. For example, when cap 628 is secured over a top portion of the exclusion piece 612 (i.e., engaged with a top surface of the flange section 614 of the exclusion piece 612) and the vapor cartridge 40, a seal is formed. As such, air is trapped within the vessel 14 such that air and/or vapor cannot be accidentally compressed or squeezed from the vessel 14 to generate a flow of air that may unintentionally operate switch 20 within the battery housing and vapor cartridge assembly. As such, with the cap 628 secured over the exclusion piece, the power source 12 can be prevented from being inadvertently drained of power. However, in some embodiments, the interior surface of the cap 628 may have one or more small grooves formed thereon to allow small amounts of air into or out of the vessel 14 so as to release vacuum pressures within the vessel 14. In the illustrated embodiment, cap 628 may be provided with a lanyard 630 having a first end coupled to the vessel 14 and a second end coupled to the cap 628 to prevent cap 628 from being lost.

Figure 29:
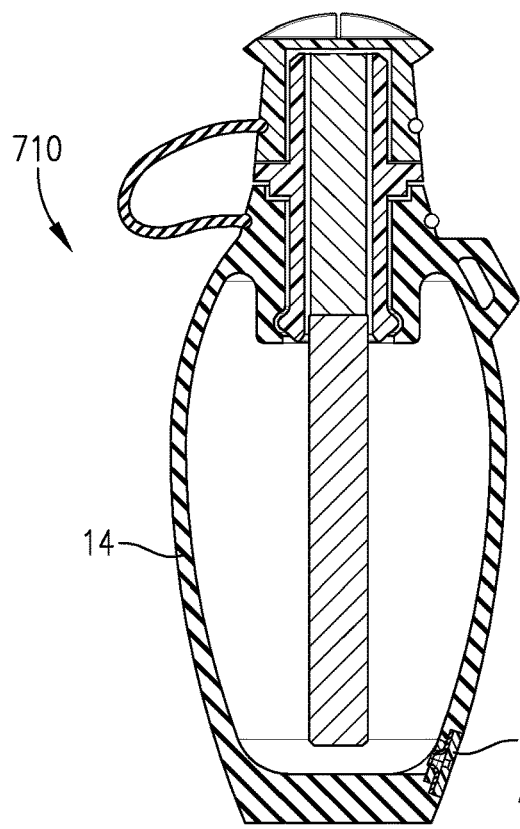
FIG. 29 is a cross-sectional view of an air movement visualization apparatus formed in accordance with an eighth embodiment of the present invention, particularly illustrating a check-valve being positioned on a side portion of the apparatus.

An air movement visualization apparatus 710 formed in accordance with an eighth embodiment of the present invention is illustrated in FIG. 29. Apparatus 710 operates in a manner similar to apparatus 610 of the seventh embodiment, but has a structural difference in that the apparatus 710 includes a valve 726 positioned on a side of vessel 14. As with valve 626, the valve 726 may be a one-way check valve. However, as shown in FIG. 29, the valve 726 may be positioned on a side of the vessel 14 where the valve is not aligned with the top opening of the vessel 14.

Figure 30:
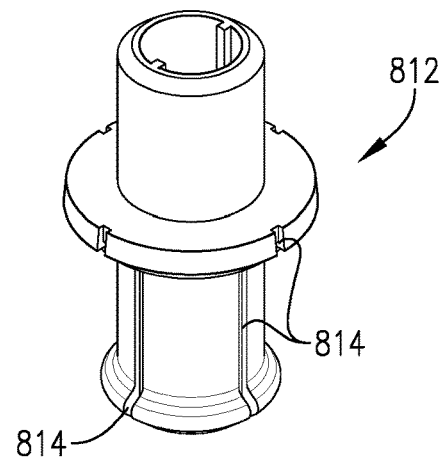
FIG. 30 is a top perspective view of an exclusion piece according to additional embodiments of the present invention, particularly illustrating the exclusion piece including air channels.
Figure 31:
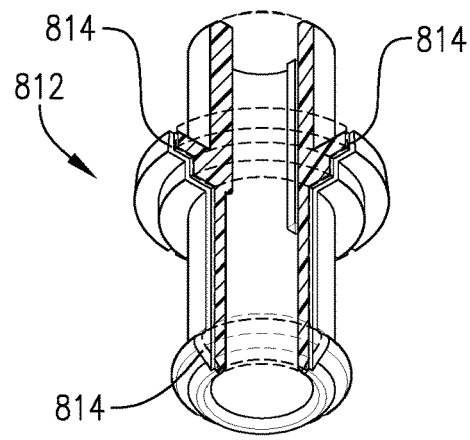
FIG. 31 is a bottom perspective view of the exclusion piece from FIG. 30, with a portion of the extrusion piece shown in phantom to illustrate an interior and cross-sections of the extrusion piece.
Figure 32:
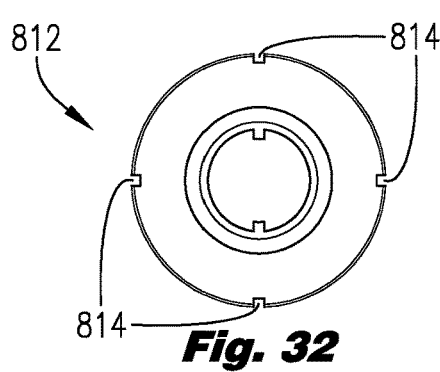
FIG. 32 is a top plan view of the exclusion piece from FIGS. 30 and 31.
Figure 33:
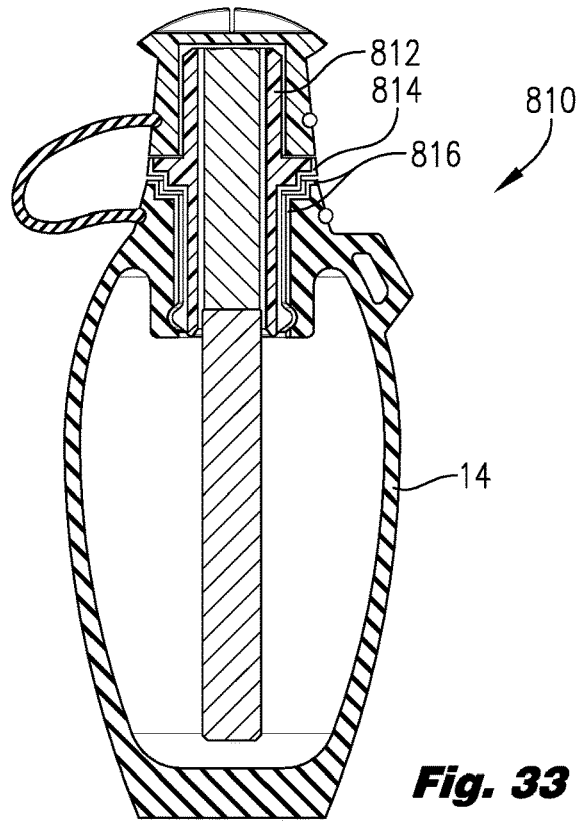
FIG. 33 is a cross-sectional view of an air movement visualization apparatus formed in accordance with a ninth embodiment of the present invention, particularly illustrating the apparatus including the exclusion piece from FIGS. 30-32 and also including air grooves, each for permitting air to fill the apparatus.

FIGS. 30-32 illustrate an exclusion piece 812 formed according to a second embodiment. FIG. 33 illustrates an air movement visualization apparatus 810 formed according to a ninth embodiment, with the apparatus 810 including the exclusion piece 812. The apparatus 810 differs from the apparatus 610 of the seventh embodiment, in that apparatus 810 does not include a valve, such as a check valve. Instead, the exclusion piece 812 is formed with one or more air channels 814. The air channels 814 may be formed as grooves that extend along at least a portion of a length of the outer surface of the exclusion piece 812. As shown in FIG. 32, certain embodiments of the exclusion piece 812 may include four air channels 814 spaced around the circumference of the exclusion piece 812.

With the exclusion piece 812 installed within the vessel 14, as shown in FIG. 33, the air channels 814 are sufficiently sized to permit air from the environment to fill the vessel 14. In certain embodiments, to provide for additional air flow, the neck of the vessel 14 may also be formed with air channels 816. The air channels 816 may be formed as grooves that extend along at least a portion of a length of the inner surface of the neck of the vessel 14. In some embodiments, the exclusion piece 812 may be installed within the vessel 14 in such an orientation that the air channels 814 of the exclusion piece 812 are aligned with the air channels 816 of the vessel 14. Regardless, the air channels 814/816 may be sized so as to permit air to flow from the external environment to within the vessel 14. However, the air channels 814/816 are sufficiently restrictive so as to at least partially prevent air within the vessel 14 from being quickly forced through the air channels 814/816 when the vessel 14 is squeezed. Instead, the air within the vessel 14 will follow a path of least resistance, through the battery housing and vapor cartridge assembly, and out of the apparatus 810. As such, the apparatus 810 functions in a manner similar to apparatus 710 even without requiring a physical one-way check valve.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

That which is claimed is:

1. An air movement visualization device for use in hunting or shooting activities, said air movement visualization device comprising:
   a flexible bulb for producing air flow when squeezed, wherein said bulb includes a neck at an upper portion of said bulb, wherein said neck presents a top opening of said bulb;
   a power and vapor assembly at least partially received in said bulb, wherein said power and vapor assembly includes a vaporizable agent, a vaporizing element for vaporizing said vaporizable agent to produce visible vapor, and a battery for powering said vaporizing element; and
   an exclusion piece configured to support said power and vapor assembly with respect to said bulb, wherein said exclusion piece comprises a generally hollow cylinder, wherein said power and vapor assembly is configured to be supported within an interior of said cylinder, wherein said exclusion piece additionally comprises a flanged section and a tab section extending from an exterior of said cylinder, wherein said flanged section and said tab section are engaged with said bulb, wherein said bulb receives said exclusion piece in the top opening presented by said neck of said bulb, wherein a bottom portion of said exclusion piece is engaged with a bottom portion of said neck of said bulb and wherein an upper portion of said exclusion piece extends upward out of said bulb, and wherein said exclusion piece supports said power and vapor assembly such that a lower portion of said power and vapor assembly extends down below said exclusion piece and within said bulb.

2. The device of claim 1, wherein said power and vapor assembly comprises a battery housing for carrying said battery and a vapor cartridge for carrying said vaporizable agent and said vaporizing element.

3. The device of claim 2, wherein said battery housing is configured to be threadedly secured to said vapor cartridge.

4. The device of claim 2, wherein said vapor cartridge is configured to be press fit into said exclusion piece.

5. The device of claim 4, wherein said exclusion piece includes one or more projection elements extending along at least a portion of an interior surface of said exclusion piece, wherein said projection elements are configured to frictionally engage with said vapor cartridge.

6. The device of claim 2, wherein said exclusion piece is configured to support said vapor cartridge such that a majority of said vapor cartridge extends out of said bulb with a vapor discharge of said vapor cartridge exposed to an external environment.

7. The device of claim 1, wherein said neck of said bulb includes a flange-engaging surface for engaging with said flange section of said exclusion piece and a tab-receiving groove for receiving said tab section of said exclusion piece.

8. The device of claim 7, wherein said exclusion piece is snap-fit into said neck of said bulb.

9. The device of claim 1, further comprising a valve for permitting air to pass from outside the bulb to inside the bulb but restricting air from passing from inside the bulb to outside the bulb.

10. The device of claim 9, wherein said valve is positioned on a side of said bulb, with said valve not being aligned with the top opening of said bulb.

11. The device of claim 1, wherein said exclusion piece includes one or more air channels formed on an exterior surface of said exclusion piece, wherein said air channels permit air to travel from outside said bulb to inside said bulb.

12. The device of claim 1, wherein said power and vapor assembly includes an LED for indicating when said battery is low on electric power.

13. The device of claim 12, wherein a portion of said bulb acts as a viewing port so as to permit a user to view said LED from outside said bulb.

14. A method for engaging a vapor cartridge with an air movement visualization device, with said air movement visualization device being used for hunting and shooting activities, said method comprising:
   (a) providing the air movement visualization device comprising a flexible bulb, a power and vapor assembly, and an exclusion piece for supporting the power and vapor assembly with respect to the bulb, wherein the bulb includes a neck at an upper portion of the bulb, with the neck presenting a top opening of the bulb;

(b) inserting at least a portion of the power and vapor assembly within the exclusion piece; and (c) inserting the exclusion piece within the bulb such that a first portion of said power and vapor assembly is positioned within the bulb and a second portion of said power and vapor assembly extends out of said bulb, wherein upon said inserting of step (c), the exclusion piece is received in the top opening presented by the neck of the bulb, with a bottom portion of the exclusion piece being engaged with a bottom portion of the neck of the bulb and an upper portion of the exclusion piece extending upward out of the bulb, and wherein the exclusion piece supports the power and vapor assembly such that a lower portion of the power and vapor assembly extends down below the exclusion piece and within the bulb.

15. The method of claim 14, further comprising the steps of:

(d) squeezing said flexible bulb to thereby produce visible vapor; and (e) viewing said visible vapor to determine wind direction.

16. The method of claim 14, wherein the power and vapor assembly comprises a vapor cartridge, and wherein during said inserting of step (b) the vapor cartridge is press fit within the exclusion piece.

17. The method of claim 14, wherein the exclusion piece comprises a generally hollow cylinder, wherein the power and vapor assembly is configured to be supported within an interior of said cylinder, wherein the exclusion piece additionally comprises a flanged section and a tab section extending from an exterior of the cylinder, wherein during said inserting of step (c) the flanged section and the tab section are configured to engage with the bulb.

18. An air movement visualization device for use in hunting or shooting activities, said air movement visualization device comprising:

a flexible bulb for producing air flow when squeezed, wherein said bulb includes a neck at an upper portion of said bulb, wherein said neck presents a top opening of said bulb;

a power and vapor assembly at least partially received in said bulb, wherein said power and vapor assembly includes a vaporizable agent, a vaporizing element for vaporizing said vaporizable agent to produce visible vapor, and a battery for powering said vaporizing element; and an exclusion piece configured to supporting said power and vapor assembly with respect to said bulb, wherein said exclusion piece comprises a generally hollow cylinder, wherein said power and vapor assembly is configured to be supported within an interior of said cylinder, wherein said exclusion piece comprises one or more air channels formed on an exterior surface of said exclusion piece, wherein said bulb receives said exclusion piece in the top opening presented by said neck of said bulb, wherein a bottom portion of said exclusion piece is engaged with a bottom portion of said neck of said bulb and wherein an upper portion of said exclusion piece extends upward out of said bulb exclusion piece supports said power and vapor assembly to permit a lower portion of said power and vapor assembly to extend down within said bulb.

19. The device of claim 18, wherein said flexible bulb additionally comprises air channels formed on a portion of an interior surface of said bulb, wherein said air channels of said exclusion piece and of said bulb permit air to travel from outside said bulb to inside said bulb.

* * * * *